F. E. SLOCOMBE.
GRINDING OR POLISHING OF GLASS AND APPARATUS THEREFOR.
APPLICATION FILED SEPT. 26, 1918.

1,404,553.

Patented Jan. 24, 1922.

3 SHEETS—SHEET 1.

INVENTOR.
F. E. Slocombe
By Rogers, Kennedy

UNITED STATES PATENT OFFICE.

FRANK EDWIN SLOCOMBE, OF ST. HELENS, ENGLAND, ASSIGNOR TO PILKINGTON BROTHERS LIMITED, OF ST. HELENS, ENGLAND, A LIMITED LIABILITY COMPANY OF GREAT BRITAIN.

GRINDING OR POLISHING OF GLASS AND APPARATUS THEREFOR.

1,404,553.  Specification of Letters Patent.  Patented Jan. 24, 1922.

Application filed September 26, 1918. Serial No. 255,730.

*To all whom it may concern:*

Be it known that I, FRANK EDWIN SLOCOMBE, a subject of the King of the United Kingdom of Great Britain and Ireland, and residing at Stockswell, Hard Lane, St. Helens, in the county of Lancaster, England, have invented new and useful Improvements in or Relating to the Grinding or Polishing of Glass and Apparatus Therefor, of which the following is a specification.

This invention relates to apparatus for grinding or polishing plate glass and has for its object a simple and inexpensive apparatus whereby, compared with existing apparatus, the glass may be ground or polished with economy of material, power and time.

According to this invention the supports for the glass plates and for the abrasive carrying surfaces are two discs with vertical surfaces, the glass being attached to the surface of one or both of the discs by means of suckers.

The two discs are mounted face to face on two parallel (or nearly parallel) shafts. One disc is provided with means for rotation, while the other disc is either free to rotate or is also provided with means for rotation, either in the same direction as the first disc or in the opposite direction. One or each of the discs is capable of being moved away from the other while running, in the direction of its axis, and is capable of being shifted edgewise in a direction at right angles to its axis.

One disc may serve as a table for holding glass while the other serves as a grinding or polishing surface, or both discs may have glass attached, each serving as a grinding surface for the other.

In an alternative form of the apparatus, a pair of discs is free to rotate between two other discs and is capable of motion in a direction at right angles to its axis and may be capable of motion in the direction of its axis. In the employment of this pair of discs, its two surfaces may serve as grinding or polishing surfaces to grind or polish glass on the two other discs, or all four available surfaces of the discs may have glass attached to them.

Figure 1:
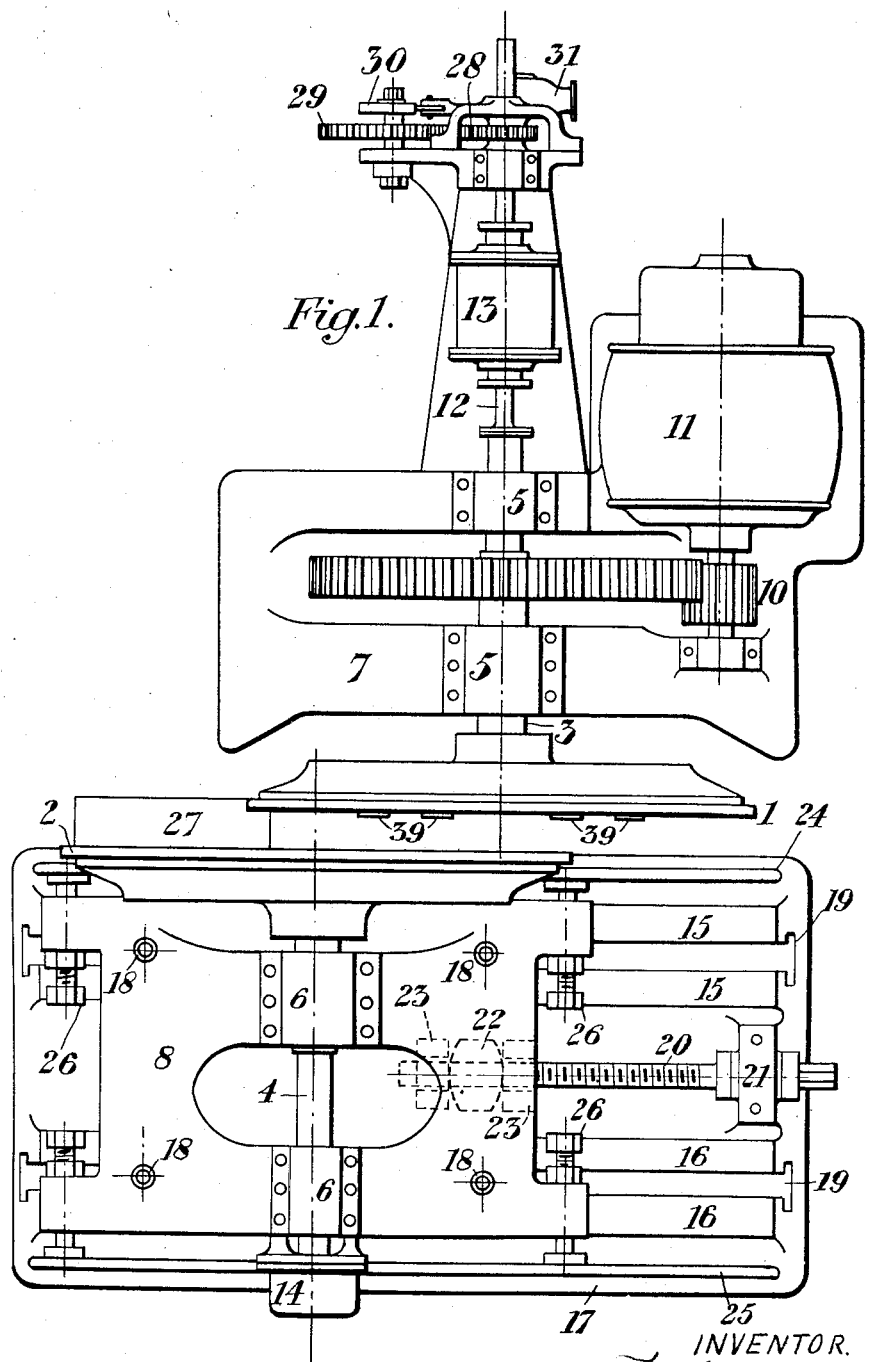
Figure 2:
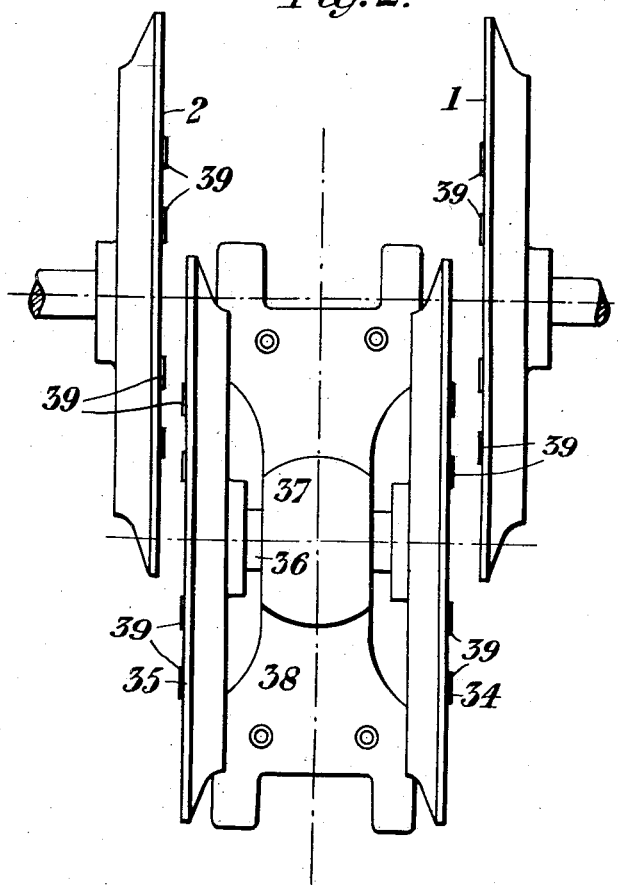
Figure 3:
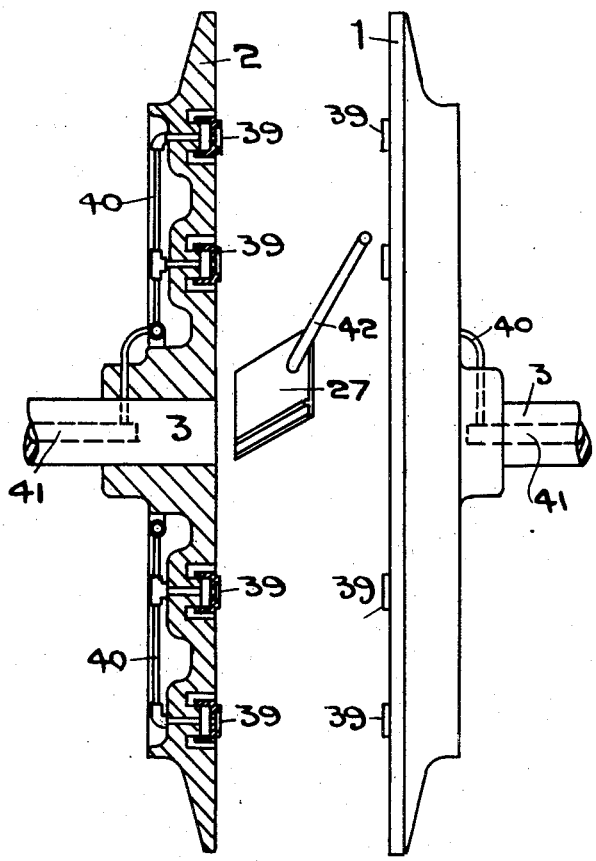
Figure 4:
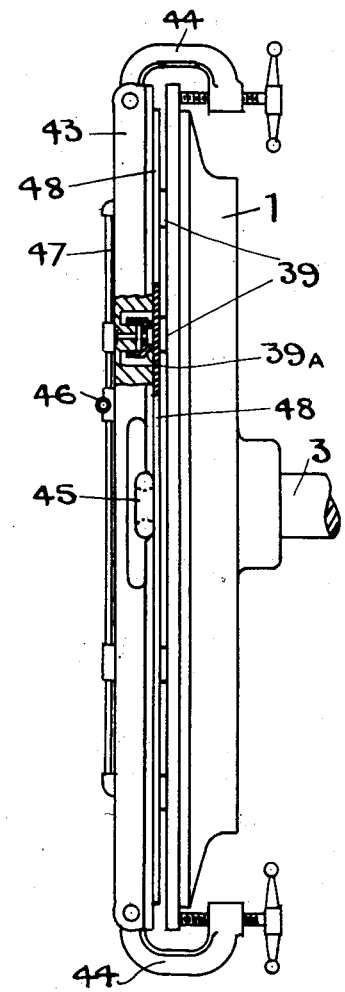

In the accompanying drawings:

Figure 1 is a plan view of one form of the apparatus according to the invention, Figure 2 is a plan view of portions of an alternative form of the said apparatus, Figure 3 is an enlarged side view of portions of a form of the apparatus arranged to take glass on both discs, and a device for supplying abrasive, one disc being represented in section to show the suckers, while the other disc is shown at a distance therefrom so as not to obscure the view of the device for supplying abrasive, and Figure 4 is a side view of disc 1 of Figure 1 showing a dummy disc in position for the transfer of glass from said dummy disc to disc 1.

Referring to Figure 1, 1 and 2 are two discs respectively secured to shafts 3 and 4 which run in bearings 5, 5 and 6, 6 mounted on frames 7 and 8. Secured to the shaft 3 is a gear wheel 9 with which gears a pinion 10 driven by a motor 11.

An extension 12 of the shaft 3 enters a cylinder 13 inside which works a piston (not shown in the drawings) attached to the said extension.

Fluid under pressure can be admitted to the side of this piston away from the disc so as to press the latter towards or against the disc 2 with any desired pressure; fluid under pressure can also be admitted to the other side of the piston so as to move the disc 1 away from the disc 2. The pipes and valves for effecting such admission of fluid pressure can be of any known form and are not shown in the drawings.

The shaft 4 is provided with a thrust bearing 14.

The frame 7 is fixed to foundations, but the frame 8 is capable of adjustment by the following means: This frame rests on and can slide along two rails 15 and 16 formed on a base plate 17. The frame 8 can be fixed to this foundation plate in any position by bolts 18 engaging in T slots 19 in the rails 15, 16.

A screw 20 turning in a bearing 21 on the base plate 17 engages with a nut 22 secured against axial movement relatively to the frame 8, by being placed between lugs 23 on the under-side of the said frame, and therefore serves to slide the frame 8 along the rails 15, 16.

The frame 8 is secured against movement at right angles to the rails 15, 16, by means of side ribs 24 and 25 on the base plate 17, and bolts 26, passing through lugs on the frame 8 and bearing against these ribs. Further, by means of these bolts 26 the frame 8 can be adjusted so that the disc 2 is at any small angle desired with the disc 1.

If the apparatus is to provide for the shifting of the frame 8 in a direction parallel to the disc 2 during the process of grinding or polishing, the side rails 15, 16 and bolts 18 are replaced by dove-tailed slides of the usual construction.

When the apparatus is to be employed to grind or polish glass attached to the disc 1, by means of abrasive applied to the disc 2, the disc 1 is fitted with suckers 39 to hold the glass thereon, the exhausting passage for the suckers being preferably, as shown more particularly in connection with the disc 2 in Figure 3, through pipe connections 40, a hole 41 through the shaft 3 leading either to an exhaust pump attached to the end of the shaft or to a pipe attached to the end of the shaft by a suitable joint, and leading to a pump.

Abrasive is supplied to the disc 2 either by a connection to the end of the shaft 4 and a hole through this shaft to the centre of the disc 2, or to that part of the surface of the disc 2 which is not covered by the disc 1, by any convenient means such as the spreading plate 27. This spreading plate has one edge in contact with the disc 2 and is inclined to it so as to form a V trough for the abrasive; it is also inclined to the horizontal lengthways so as to allow the abrasive from the supply pipe 42 to flow towards the disc 1.

The surface of the disc 2 may be provided with any suitable form of grinding surfaces or with felt or other material to serve as polishing surfaces.

In order to distribute the abrasive over the surfaces of the discs, it is preferred to separate the discs momentarily at intervals, sufficiently to bring them out of operative contact, and the following device is preferred for effecting this automatically:—Sliding on a feather at the end of the shaft extension 12 is a gear wheel 28, engaging with a second gear wheel 29, to which is attached a cam 30, which operates a valve 31 in the pipe system for the supply of fluid pressure to the cylinder 13. This valve is arranged so that, when operated by the cam, the pressure is released from the side of the piston away from the disc 1 and fluid under pressure is admitted to the other side, so as to move that disc away from the disc 2. By suitably shaping the cam 30, the withdrawal of the disc 1 can be made as rapid as possible, while its return to its normal position, that is to say, pressed towards the disc 2, can be made sufficiently gradual to avoid danger of breakage of the glass by too sudden an application of pressure.

The axial motion of the disc 1 and shaft 3 may be effected by any convenient mechanical means instead of by the cylinder 13, for example the periodic withdrawal of the disc 1 may be effected by a cam plate acting on the shaft 3.

It is preferred to actuate the valve or gate controlling the supply of abrasive to the discs 1, 2 simultaneously with the movement of the shaft to separate the discs.

If it be desired to rotate the disc 2 positively, the frame 8 is constructed similarly to the frame 7, with a gear wheel and pinion driven by motor.

The two discs, when both are rotated positively, may be rotated either in the same or in the opposite directions.

Instead of employing one of the discs, as shown in Figure 1, merely as a grinding surface, both discs may be provided with suckers 39, as shown in Figure 3, and be faced with glass. The two glass surfaces will then, by means of abrasive supplied between them grind each other, with a great saving in time, power and plant, and with the further advantage that the sand employed for grinding will not be contaminated by particles of the iron grinding surfaces and so will be fit for use in the manufacture of glass. The abrasive can then be supplied to the surface of either one or both of the discs in the manner shown in Figure 3 and already described.

Figure 2 shows the arrangement in which a pair of discs 34 and 35 are mounted on a shaft 36 running in a spherically-seated bearing 37, and are placed between two positively-driven discs 1 and 2. In this arrangement the frames of the two discs 1 and 2 may be fixed so that their shafts are co-axial, while the frame 38 of the two discs 34 and 35 may be mounted on slide rails so as to be capable of lateral adjustment in direction perpendicular to their common axis. The four surfaces of the discs 1, 2, 34, 35, may all have glass attached to them, or two may have glass attached while the other two act as grinding or polishing surfaces.

When glass is attached to both of the discs 34 and 35, the suckers 39 on the latter are exhausted preferably by means of a pump and motor attached to the back of one of the discs, current being taken to the motor by slip rings on the shaft 36.

In this arrangement it is preferable to apply pressure between the surfaces of the discs by means of a cylinder similar to 13, Figure 1, at the end of each of the shafts of the discs 1 and 2, both cylinders being operated simultaneously by a single set of valves, so that the pressures of the two discs 1 and 2 on the discs 34 and 35 may be always in balance.

In order to expedite the attachment of the glass on to the discs, and its transference from the grinding to the polishing disc, a dummy disc is employed which is provided with suckers and is similar to the grinding discs except that it may be of lighter construction and is provided with an eye-bolt for the crane-hook, and side cramps for temporarily bringing it into contact with one of the grinding discs.

Figure 4 shows such a dummy disc 43 so held to the disc 1 by the side cramps 44, 44. The dummy disc 43 is provided with an eye-bolt 45 whereby it can be transported by crane, and an attachment 46 to the pipe work 47 connected to the suckers 39$^a$, whereby the latter can be exhausted by a pump carried on the crane. The dummy disc 43 is shown with a plate of glass 48 attached thereto by the suckers 39$^a$, and placed in position against the suckers 39 of disc 1, the side cramps 44 being put in position but not tightened. On tightening the cramps 44, the plate of glass is brought into contact with disc 1 and then, on exhausting the suckers 39 on disc 1 and releasing the suckers 39$^a$ on the dummy disc 43, the dummy disc can be removed leaving the glass in position on the disc 1.

Similarly, when glass has to be transferred from a grinding disc to a polishing disc, a dummy disc is brought into contact with the ground glass, which is attached thereto by operating the suckers of the two discs, and the dummy disc with the ground glass is then brought into contact with the polishing disc, and the glass transferred thereto.

When, after the glass has been ground or polished on one side, it is to be turned over for grinding or polishing its other side, it is taken from the grinding or polishing disc by one dummy disc and from this it is transferred to a second dummy disc, from which it is transferred to the same or another grinding or polishing disc, for grinding or polishing the second side.

It is preferable to arrange the suckers on all the grinding, polishing and dummy discs in the same positions relatively to the centres of these discs, and to provide registers between the dummy and the working discs, so that, in transferring glass from a dummy to a working disc or vice-versa, if the working disc be turned to a registering point, the suckers on the two discs will be facing one another. In this way the initial arrangement of the glass relatively to the suckers can be maintained throughout all the transfers of the glass.

When the grinding apparatus is employed to grind only one surface of glass between any pair of discs, it is preferred to employ as the grinding surface on one of the discs, plates or blocks of waste glass attached to the disc by suckers, and to transfer the glass to another grinding apparatus for finishing with emery. The facility with which the glass can be transferred from one disc to another, permits this to be done, and thereby to secure the advantage that the sand, after use as abrasive, can be employed for glass manufacture.

Having described my invention, I declare that what I claim and desire to secure by Letters Patent is: —

1. In apparatus for grinding or polishing plate glass, the combination with two opposed discs with grinding or polishing faces in parallel or nearly parallel planes and two horizontal shafts on which said discs are respectively mounted, these shafts being parallel or nearly parallel and out of line sufficiently to secure effective grinding or polishing at the centres of the discs, of means positively to rotate one disc, and sucker devices to secure the glass to be ground to a disc surface.

2. In apparatus for grinding or polishing plate glass, the combination with two opposed discs with grinding or polishing faces in parallel or nearly parallel planes and two horizontal shafts on which these discs are respectively mounted, said shaft being parallel or nearly parallel and out of line sufficiently to secure effective grinding or polishing at the centres of the discs, means adapted to rotate one at least of the discs and sucker devices to secure the glass to the disc surface, of means whereby the shaft of one of the discs may be moved more or less out of line with the shaft of the other disc.

3. In apparatus for grinding or polishing plate glass, the combination with two opposed discs and two horizontal shafts on which those discs are respectively mounted said shafts being parallel or nearly parallel and out of line sufficiently to secure effective grinding or polishing at the centres of the discs, and means adapted to rotate one at least of the discs, or means adapted to impart a periodic and momentary end-wise movement to one of the shafts whereby the two discs are moved into and out of operative contact during the process of grinding or polishing.

4. In apparatus for grinding or polishing plate glass, the combination with four discs, a horizontal shaft on which two of the discs are mounted, and two co-axial and separate shafts on which the other two discs are respectively mounted, said shafts being parallel or nearly parallel and the two discs which are both fast to the same shaft being located between the two other discs, and each opposed to one of those discs, and means adapted to rotate at least one disc of each opposed pair of discs, of means adapted to simultaneously impart a periodic and momentary end-wise movement to the shafts carrying the last-named two discs whereby these latter are moved into and out of frictional relationship with their respective companion discs during the process of grinding or polishing.

5. In apparatus for grinding or polishing plate glass, the combination with two opposed discs and two shafts on which those discs are respectively mounted, said shafts being parallel or nearly parallel and out of line sufficiently to secure effective grinding or polishing at the centres of the discs, and means adapted to rotate at least one of said discs and impart periodic and momentary axial movement to one of the discs relatively to the other disc, of means adapted to supply abrasive between the two discs at the moment when the latter are moved apart.

6. In apparatus for grinding or polishing plate glass, the combination with two discs and two horizontal shafts on which those discs are respectvely mounted, said shafts being parallel or nearly parallel and out of line sufficiently to secure efficient grinding or polishing at the centres of the discs, of a dummy disc, suckers on said dummy disc, and on one of the two first-mentioned discs whereby glass can be attached to such discs and transferred from one to another thereof.

7. In apparatus for grinding or polishing plate glass, the combination with two discs and two horizontal shafts on which those discs are respectively mounted, said shafts being parallel or nearly parallel and out of line sufficiently to secure effective grinding or polishing at the centres of the discs, of a frame rotatably supporting one of the shafts, a base plate on which the frame is horizontally adjustable and means adapted to so adjust the frame.

8. In apparatus for grinding or polishing plate glass, the combination with two discs and two horizontal shafts on which those discs are respectively mounted, said shafts being parallel or nearly parallel and out of line sufficiently to secure effective grinding or polishing at the centres of the discs, of a frame rotatably supporting one of the shafts, a base plate on which the frame is horizontally adjustable, and bolts adapted to adjust the frame in a direction parallel with or at a slight angle to the axis of the shaft supported in the frame.

In testimony whereof I have affixed my signature hereto.

FRANK EDWIN SLOCOMBE.